United States Patent [19]

White

[11] 4,036,149
[45] July 19, 1977

[54] FABRICATED HOPPER CAR OUTLET DOOR FRAME

[75] Inventor: Clarence E. White, Kenosha, Wis.

[73] Assignee: Miner Enterprises, Inc., Chicago, Ill.

[21] Appl. No.: 601,921

[22] Filed: Aug. 4, 1975

[51] Int. Cl.$^2$ .......................... B61D 7/02; B61D 7/22; F16B 1/00; F16B 5/07
[52] U.S. Cl. ................................. 105/280; 52/656; 105/253; 105/424; 403/205; 403/231
[58] Field of Search .................... 29/462, 469; 52/287, 52/288, 656, 751, 752, 753 C, 753 D, 753 R, 758 B, 758 F, 758 H, 758 R; 105/253, 280, 424; 228/176, 178, 182; 403/187, 205, 231, 270, 271, 272, 345

[56] References Cited

U.S. PATENT DOCUMENTS

| | | | |
|---|---|---|---|
| 1,953,014 | 3/1934 | Hankins | 105/424 X |
| 2,341,612 | 2/1944 | Hankins | 105/280 |
| 2,519,529 | 8/1950 | Wine | 105/253 |
| 2,589,468 | 3/1952 | Wine | 105/280 X |
| 2,589,729 | 3/1952 | Rates | 52/656 |
| 2,591,924 | 4/1952 | Dorey | 105/280 X |
| 2,594,580 | 4/1972 | Paul | 403/205 X |
| 2,712,289 | 7/1955 | Dorey | 105/280 |
| 2,784,679 | 3/1957 | Wine | 228/178 X |
| 3,722,928 | 3/1973 | Skubic | 52/758 H |
| 3,912,407 | 10/1975 | Heininger | 403/231 |

Primary Examiner—Albert J. Makay
Assistant Examiner—Howard Beltran
Attorney, Agent, or Firm—Darbo, Robertson & Vandenburgh

[57] ABSTRACT

The door frame includes an upper frame member, a pair of Z-configuration side frame members secured to the upper frame member, a lower frame member, and a pair of Z-configuration corner fittings interconnecting the lower the frame member with the side frame members. Each corner fitting comprises a first wall section having an intermediate wall portion and first and second end flange portions, and a second wall section joined to the first wall section and having an intermediate wall portion and a first end flange portion. The first end flange portions have secured therebetween the adjacent end of one of the side frame members, while the second end flange portion is secured to the adjacent end of the lower frame member.

12 Claims, 14 Drawing Figures

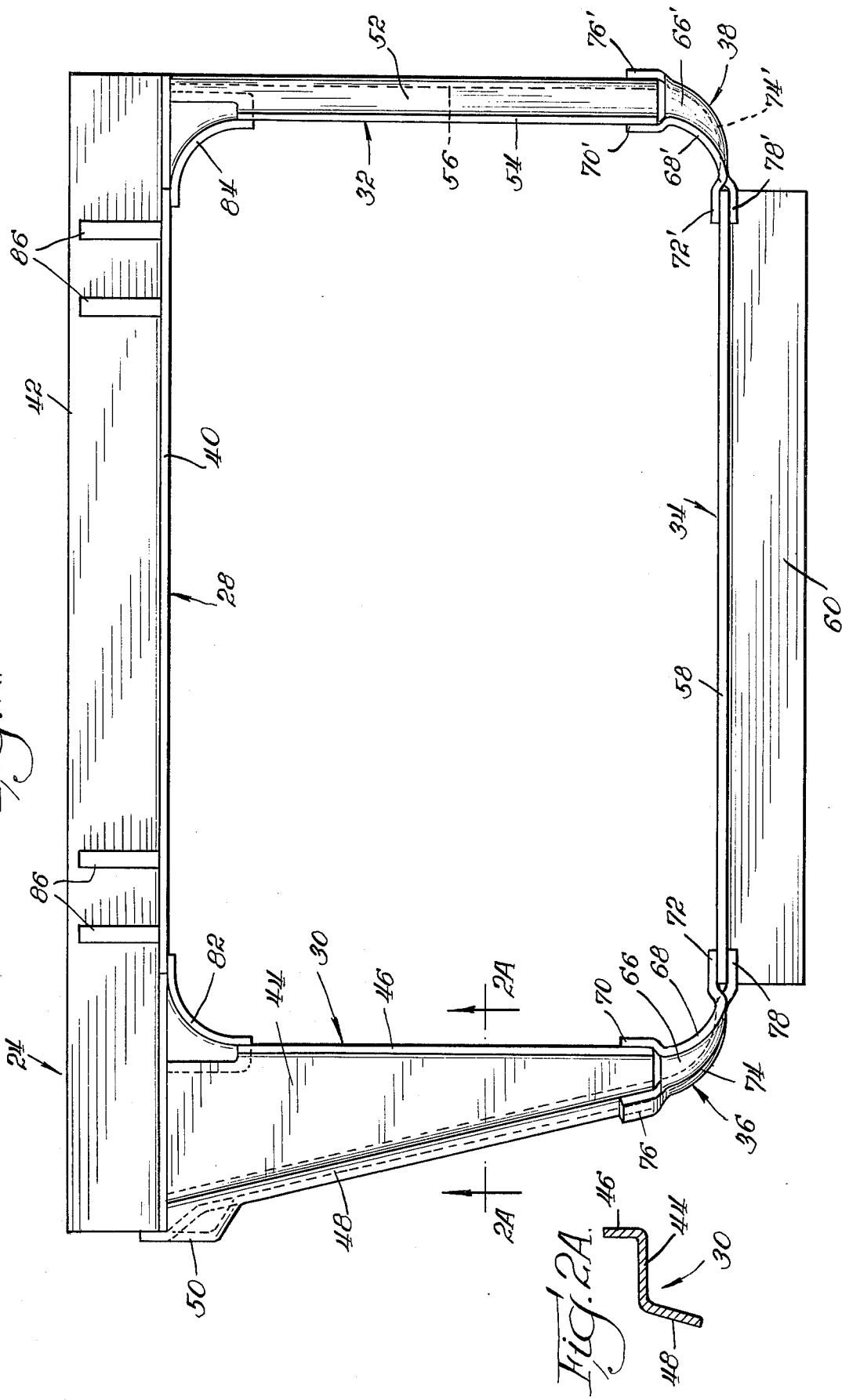

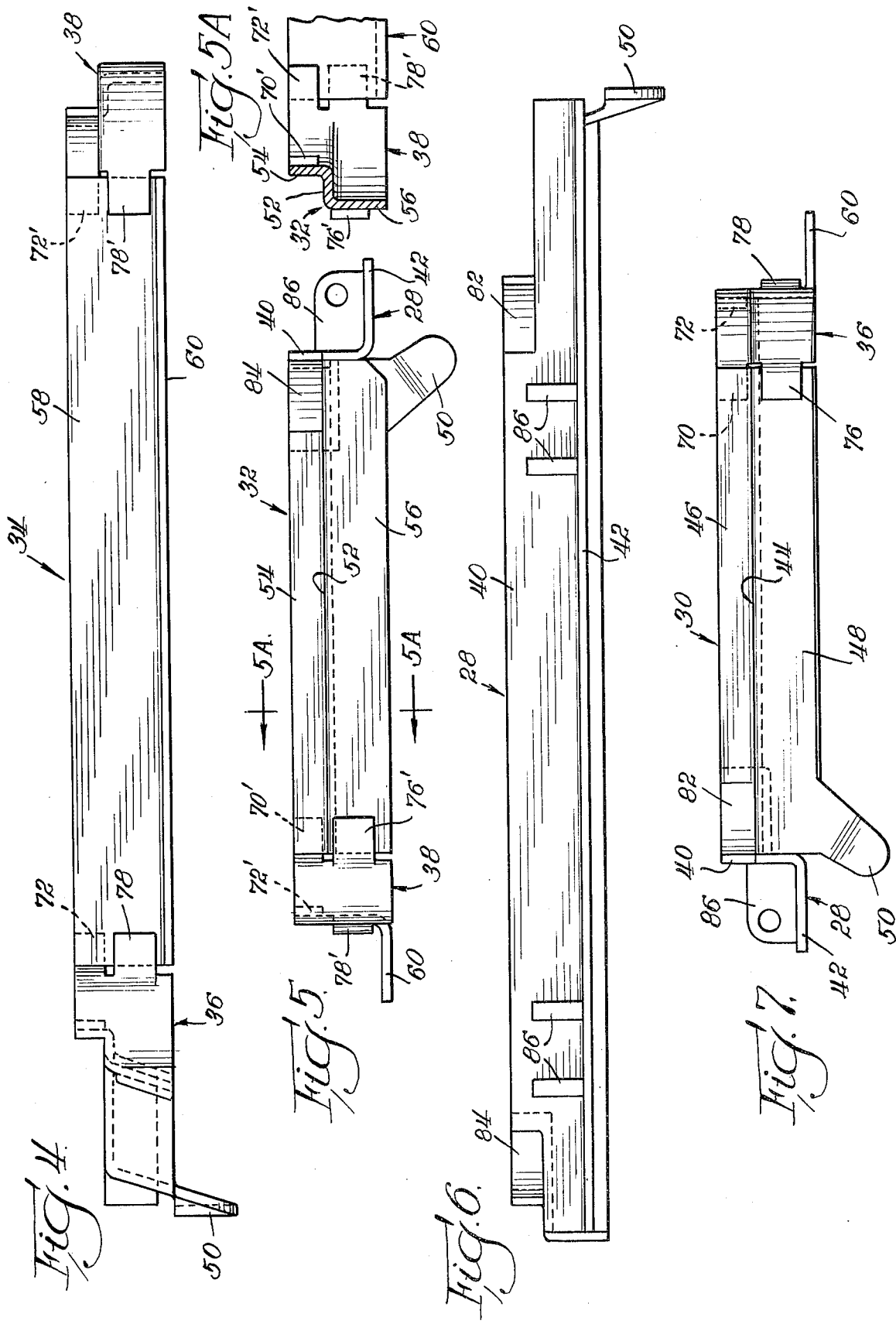

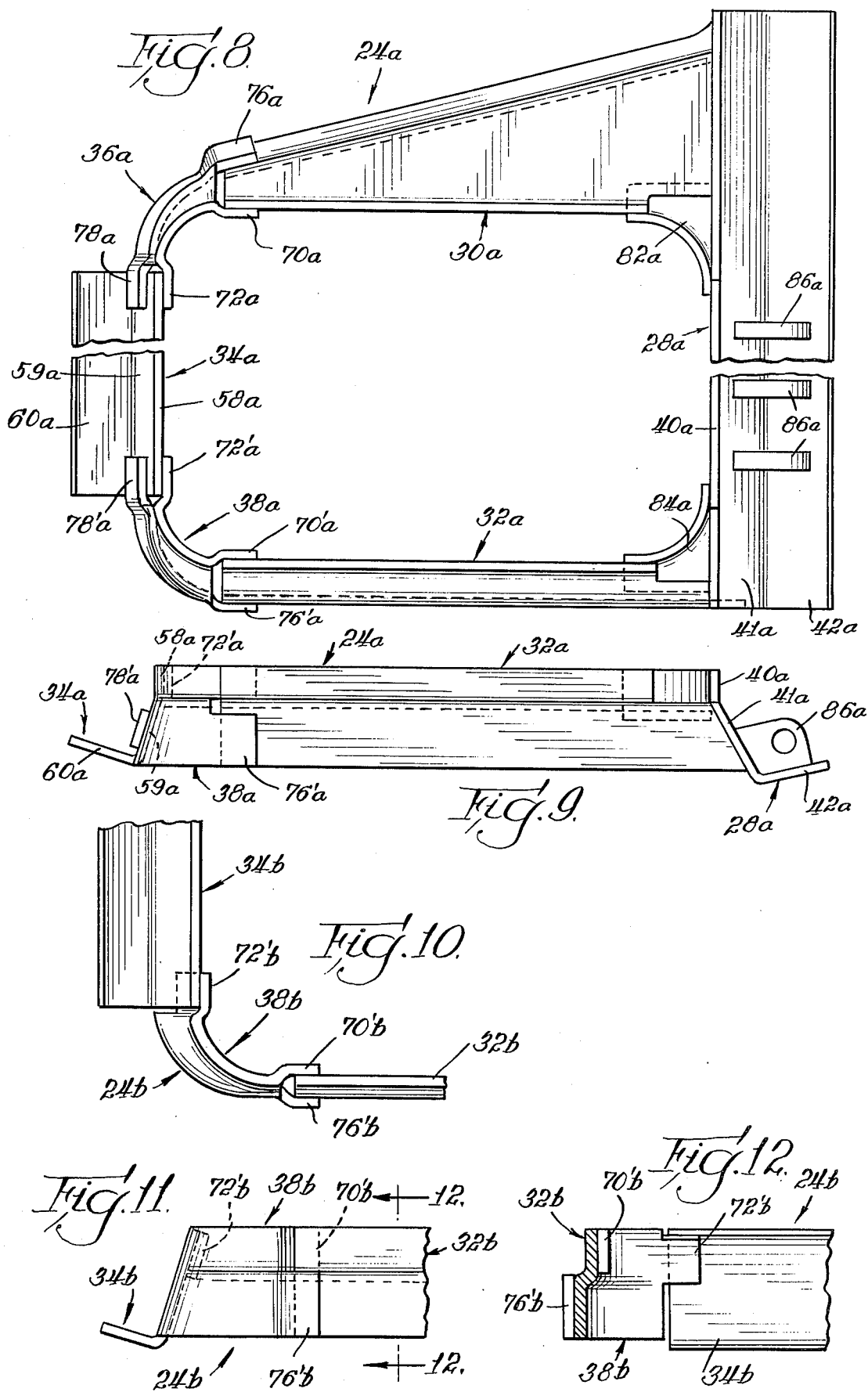

4,036,149

FABRICATED HOPPER CAR OUTLET DOOR FRAME

BACKGROUND OF THE INVENTION

1. Field of the Invention

The present invention pertains generally to hopper outlet door frames, which are adapted for use in connection with railrod hopper cars, and through which lading within the car is adapted to be discharged by gravity.

2. Description of the Prior Art

A hopper outlet door frame is mounted in the outlet opening (usually trapezoidal) of the hopper section of a railroad hopper car, and swingably supports a door (usually rectangular) adapted to open or close the door frame opening. Existing hopper outlet door frames are cast from steel in one piece. This manufacturing procedure requires not only expensive foundry patterns which are subject to shrinkage and warping, but also different sets of patterns for each different frame size and shape.

SUMMARY OF THE INVENTION

In accordance with the present invention, the various components of a hopper outlet door frame are prefabricated from heavy sheet steel, placed in a jig, and welded together.

The fabricated door frame comprises an upper frame member, a pair of side frame members respectively secured at their one ends to the ends of the upper frame member, a lower frame member extending between the other end of the side frame members, and a pair of corner fittings respectively interconnecting the other ends of the side frame members and the adjacent ends of the lower frame member.

Each of the corner fittings includes a first generally axially outward radially inner wall section with an intermediate wall portion and first and second end flange portions lying in perpendicular planes, and a second generally axially inward radially outer wall section with an intermediate wall portion and at least a first end flange portion generally radially spaced from the first end flange portion of the first wall section. The first end flange portions have secured therebetween the adjacent end of one of the side frame members, and the second end flange portion of the first wall section is secured to the adjacent end of the lower frame member.

The fabrication of a door frame, as indicated, eliminates the use of expensive foundry patterns; and the corner fittings minimize fabrication time, readily accommodate the fabrication of different size door frames, and reduce the accuracy to which the side and lower frame members must be cut in length.

BRIEF DESCRIPTION OF THE DRAWINGS

FIG. 2 is a bottom view, on an enlarged scale, of one embodiment of hopper outlet door frame of the present invention;

FIG. 2A is a sectional view taken substantially along the line 2A—2A in FIG. 2 looking in the direction indicated by the arrows;

FIG. 4 is an elevational view of the lower portion of the hopper outlet door frame of FIG. 2; FIG. 5 is an elevational view of the right-hand side of the hopper outlet door frame of FIG. 2;

FIG. 5A is a sectional view taken substantially along the line 5A—5A in FIG. 5 looking in the direction indicated by the arrows;

FIG. 6 is an elevational view of the upper portion of the hopper outlet door frame of FIG. 2;

FIG. 7 is an elevational view of the left-hand side of the hopper outlet door frame of FIG. 2;

FIG. 8 is a bottom view, foreshortened in width, of a modified embodiment of hopper outlet door frame of the present invention;

FIG. 9 is a side elevational view of the hopper outlet door frame of FIG. 8;

FIG. 10 is a bottom view of the right-hand corner of another embodiment of hopper oulet door frame of the present invention;

FIG. 11 is a partial side elevational view of the hopper outlet door frame of FIG. 10; and FIG. 12 is a sectional view taken substantially along the line 12—12 in FIG. 11 looking in the direction indicated by the arrows.

DESCRIPTION OF THE PREFERRED EMBODIMENTS

Figure 1:
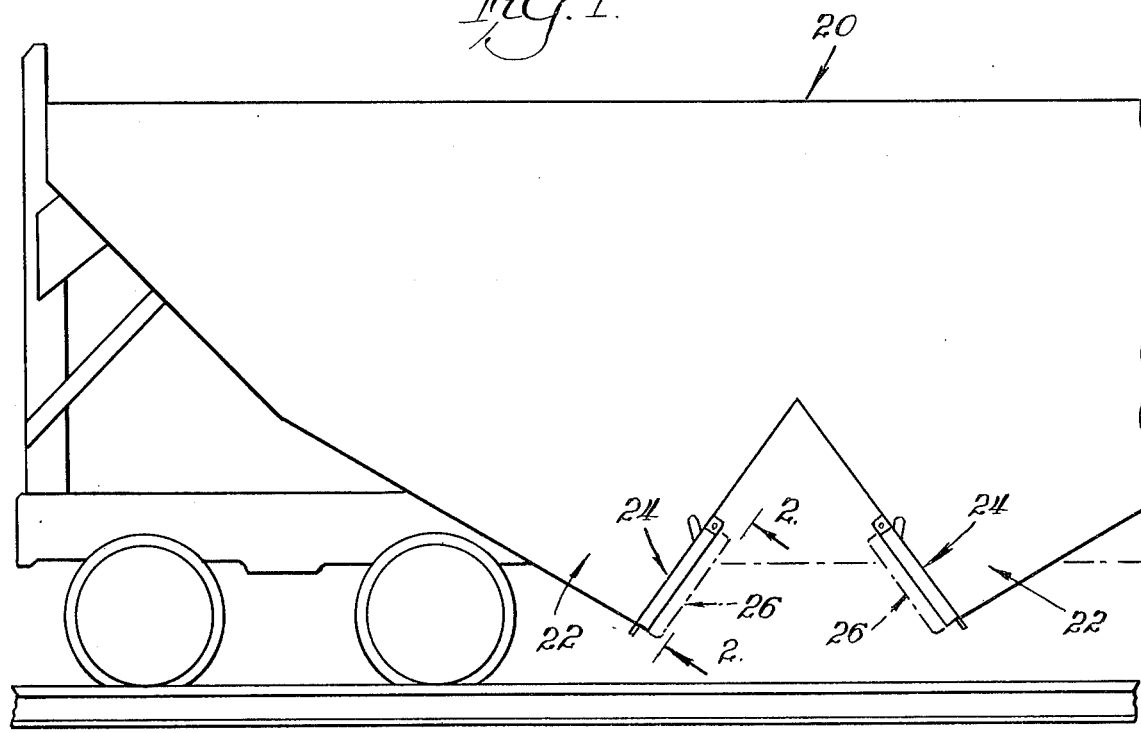
FIG. 1 is a partial side elevational view of a railway hopper car incorporating hopper outlet door frames constructed in accordance with the principles of the present invention.

Referring now to FIG. 1, there is indicated generally by the reference numeral 20 a portion of a railroad hopper car having a plurality of hopper sections 22. Mounted in the outlet openings of the hopper sections 22 are fabricated door frames 24 which incorporate the principles of the present invention and which swingably support conventional closure doors 26.

As shown in FIG. 2, the door frame 24 has a generally trapezoidal outer configuration which accommodates mounting of the frame in a generally trapezoidal outlet opening, and has a generally rectangular inner configuration which accommodates use with the frame of a generally rectangular closure door. Basically, the door frame 24 comprises an L-shaped (in cross section) upper frame member 28, a pair of generally Z-shaped (in cross section) side frame members 30 and 32, an L-shaped (in cross section) lower frame member 34, and a pair of corner fittings 36 and 38.

Relative to the transverse centerline of the inner configuration or opening of the door frame 24, the upper frame member 28 (FIGS. 2 and 6) has a generally axially extending radially inner leg portion 40, and a generally radially extending radially outer leg portion 42. The side frame member 30 (FIGS. 2, 2A and 7) has a generally radially extending web portion 44 which tapers in a downward direction, a first generally axially outward radially inner leg portion 46 perpendicular to the web portion 44 and in a plane perpendicular to the upper frame member 28, and a second generally axially inward radially outer oppositely directed generally radially outwardly inclined leg portion 48 converging toward the first leg portion 46 in a downward direction and including an upper flange portion 50. The side frame member 32 (FIGS. 2, 5 and 5A) is perpendicular to the upper frame member 28; and has a generally radially extending web portion 52, a first generally axially outward radially inner leg portion 54, and a second generally axially inward radially outer leg portion 54 and 56 being perpendicular to the web portion 52 in parallel planes. The lower frame member 34 (FIGS. 2 and 4) is parallel to the upper frame member 28; and has a generally axially extending radially inner leg portion 58, and a generally radially extending radially outer leg portion 60.

Figure 3:
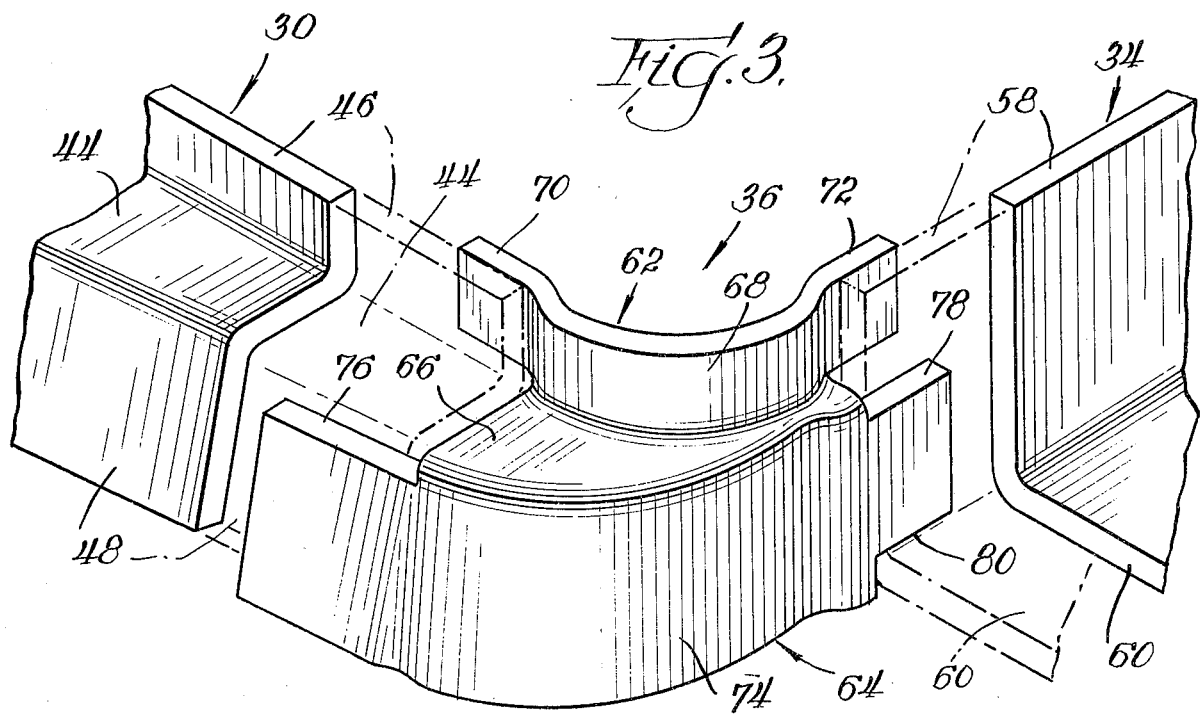
FIG. 3 is an exploded perspective view of the left-hand corner of the hopper outlet door frame of FIG. 2.

As shown in FIG. 3, the corner fitting 36 comprises a first generally axially outward radially inner wall section 62, a second generally axially inward radially outer wall section 64, and a third generally radially extending wall section 66. The first wall section 62 includes an arcuate wall portion 68, a first end flange portion 70, and a second end flange portion 72, with the flange portions 70 and 72 being offset generally radially inwardly and lying in perpendicular planes. The second wall section 64 includes an arcuate wall portion 74, a first end flange portion 76, and a second end flange portion 78, with the flange portions 76 and 78 being offset generally radially outwardly and spaced generally radially outwardly from the flange portions 70 and 72. The end flange portion 76 is generally radially outwardly inclined and diverges away from the end flange portion 70 in an upward direction; while the end flange portion 78 is parallel to the end flange portion 72 and is formed with a cut-out 80. The centers of curvature of the arcuate wall portions 68 and 74 are spaced apart, and the radius of curvature of the arcuate wall portion 74 is greater than the radius of curvature of the arcuate wall portion 68. The third wall section 66 is semi-crescent shaped, and joins the arcuate wall portions 68 and 74 whereby the radial spacing between the end flange portions 70 and 76 is greater than the radial spacing between the end flange portions 72 and 78. As shown in FIG. 2, the corner fitting 38 is substantially the same as the corner fitting 36, and primed reference numerals have been used to identify those elements of the fitting 38 which are the same or similar to the correspondingly numbered elements of the fitting 36. It differs in the following respects: the fitting 38 is generally a mirror image of the fitting 36, and the end flange portions 70' and 76' are arranged in parallel with different spacing than the end flange portions 70 and 76.

In the manufacture of the door frame 24, the various components are first individually prefabricated from heavy sheet steel to the desired configuration and size. Then, the components are located in position in a jig or fixture. The one ends of the side frame members 30 and 32 are disposed in abutment with the upper frame member 28; the other ends of the side frame members 30 and 32 are disposed respectively between the flange portions 70, 76 and 70', 76' of the corner fittings 36 and 38; and the ends of the leg portion 58 of the lower frame member 34 are disposed respectively between the flange portions 72, 78 and 72', and 78' of the corner fittings 36 and 38. Next, inner corner gussets 82 and 84 are positioned between the upper frame member 28 and the side frame members 30 and 32, and hinge butts 86 (to which a conventional closure door is adpated to be pivoted) are positioned along the upper frame member 28. Finally, all adjoining edges and surfaces of the various components are welded together.

It will be appreciated that the fabricated door frame 24 may be manufactured without the use of expensive foundry patterns. Also, because the flange portions of the corner fittings overlap the adjacent ends of the side and lower frame members, these frame members need not be cut accurately to length during prefabrication. Additionally, by using corner fittings, fabrication time is minimized, and different size door frames may be fabricated simply by varying the length of the side and/or lower frame members. In sum, the fabricated door frame 24 offers many advantages over a conventional cast steel door frame.

Furthermore, the components—and particularly the corner fittings—may be modified to accommodate different hopper section slopes and different angularity of door openings.

For example, one modified embodiment of door frame is shown in FIGS. 8 and 9. Reference numerals with the subscript $a$ have been used to identify those components which are the same or similar to the correspondingly numbered components shown in FIGS. 2—7. The door frame 24$a$ is substantially the same as the door frame 24, with the following principal exceptions: The lower generally L-shaped frame member 34$a$ includes a generally axially outward radially inner leg portion 58$a$, an intermediate leg portion 59$a$, and a generally axially inward radially outer inclined leg portion 60$a$; and the end flange portion 78$a$ of the corner fitting 36$a$, and the end flange portion 78$a'$ of the corner fitting 38$a$, are generally radially outwardly inclined. In assembled relation, the flange portions 72$a$ and 72$a'$ are secured to the inboard side of the leg portion 58$a$, while the flange portions 78$a$ and 78$a'$ are secured to the outboard side of the leg portion 59$a$. In a similar manner, the upper generally L-shaped frame member 28$a$ is formed with a generally axially outward radially inner leg portion 40$a$, an intermediate leg portion 41$a$, and a generally axially inward radially outer inclined leg portion 42$a$.

Another modified embodiment of door frame is shown in FIGS. 10-12. Reference numerals with the subscript $b$ have been used to identify those components which are the same or similar to the correspondingly numbered components shown in FIGS. 2-9. The door frame 24$b$ is substantially the same as the door frame 24, with the principal exception of the corner fittings. For example with respect to the corner fittings 38$b$, an end flange portion corresponding to the end flange portion 78' of the corner fitting 38 is omitted, and the end flange portion 72$b'$ is generally radially outwardly inclined whereby the lower frame member 34$b$ is angularly disposed about its longitudinal axis. The fitting (not shown) at the opposite corner of the door frame 24$b$ is similar to the corner fitting 36, less an end flange portion corresponding to the end flange portion 78, and with the end flange portion corresponding to the end flange portion 72 being radially outwardly inclined like the end flange portion 72$b'$.

While there have been shown and described preferred embodiments of the present invention, it will be understood by those in the art that various rearrangements and modifications may be made therein without departing from the spirit and scope of the invention.

The invention claimed is:

1. A fabricated hopper outlet door frame comprising an upper frame member; a pair of side frame members respectively secured at their one ends to the ends of said upper frame member, said side frame members comprising inner and outer leg portions and a web which are positioned in an approximately Z-configuration as viewed in cross section; a lower frame member extending between the other ends of said side frame members; and a pair of corner fittings respectively interconnecting said other ends of said side frame members and the adjacent ends of said lower frame member, each of said corner fittings including a first generally axially outward radially inner wall section comprising an intermediate wall portion and having first and second end flange portions lying in perpendicular planes, a second generally axially inward radially outer wall section comprising an intermediate wall portion and having at least a first end flange portion generally radially spaced from said first end flange portion of said wall section, and an intermediate wall section integral with said first and second wall sections with the wall sections being positioned in an approximately Z-configuration as viewed in cross section, said first end flange portions of said first and second wall sections being respectively in juxtaposition to the inner and outer leg portions of the adjacent end of one of said side frame members and being secured thereto, said second end flange portion of said first wall section being in juxtaposition to a part of the adjacent end of said lower frame member and being secured thereto.

2. The hopper outlet door frame of claim 1 wherein said frame has a generally trapezoidal outer configuration and a generally rectangular inner configuration, at least one of said side frame members having its web portion tapering in a downward direction and the inner leg portion perpendicular to said web portion and its outer leg portion converging toward said first leg portion in a downward direction.

3. The hopper outlet door frame of claim 2 wherein said outer leg portion of said one side frame member is outwardly inclined, and said first end flange portion of said second wall section of said one corner fitting is outwardly inclined.

4. The hopper outlet door frame of claim 2 wherein said lower frame member comprises two leg portions and is generally L-shaped in cross section, and said secnd end flange portion of said one corner fitting is secured to one leg portion of said lower frame member.

5. The hopper outlet door frame of claim 2 wherein said second end flange portion of said one corner fitting is outwardly inclined and secured to said lower frame member whereby to angularly dispose the latter about its longitudinal axis.

6. The hopper outlet door frame of claim 2 wherein said intermediate wall portions of said first and second wall sections of each of said corner fittings are arcuate.

7. The hopper outlet door frame of claim 6 wherein said end flange portions of said first wall section of each of said corner fittings are offset radially inwardly.

8. The hopper outlet door frame of claim 6 wherein said second wall section of each of said corner fittings has a second end flange portion, and said end flange portions of said second wall section of each of said corner fittings are offset radially outwardly, said part of the adjacent end of the lower frame member being between the second end flange portions of the respective corner fitting.

9. The hopper outlet door frame of claim 6 wherein said intermediate wall section of each of said corner fittings is semi-crescent shaped.

10. The hopper outlet door frame of claim 6 wherein the centers of curvature of said arcuate wall portions of said first and second wall sections of each of said corner fittings are spaced apart, and the radius of curvature of said arcuate wall portion of said second wall section of each of said corner fittings is greater than the radius of curvature of said arcuate wall portions of said first wall section.

11. The corner fitting of claim 10 wherein the intermediate wall portions of the first and second wall sections are arcuate with their centers of curvature being spaced apart, the radius of curvature of said arcuate wall portion of said second wall section is greater than the radius of curvature of said arcuate wall portion of said first wall section, and said intermediate wall section is crescent shaped.

12. For use in a fabricated hopper outlet door frame, a corner fitting comprising a first generally axially outward radially inner wall section comprising an intermediate wall portion and having first and second end flange portions lying in perpendicular planes, a second generally axially inward radially outer wall section comprising an intermediate wall portion and having at least a first end flange portion generally radially spaced from said first end flange portion of said first wall section, and an intermediate wall section integral with said first and second wall sections with the wall sections being positioned in an approximately Z-configuration as viewed in cross section.

* * * * *

UNITED STATES PATENT AND TRADEMARK OFFICE
CERTIFICATE OF CORRECTION

PATENT NO. : 4,036,149
DATED : July 19, 1977
INVENTOR(S) : Clarence E. White

It is certified that error appears in the above-identified patent and that said Letters Patent are hereby corrected as shown below:

Abstract, line 5, "the" should be deleted after "lower".
Column 1, line 9, "railrod" should read --railroad--.
Column 1, line 33, "end" should read --ends--.
Column 2, line 2, "FIG. 5" should start a new paragraph.
Column 2, line 18, "oulet" should read --outlet--.
Column 2, line 65, after "portion" should be inserted --56, with the leg portions--.
Column 3, line 51, the comma should be deleted after "72'".
Column 3, line 55, "adpated" should read --adapted--.
Column 4, line 37, "fittings" should read --fitting--.
Column 4, line 51, after "those" should be inserted --skilled--.
Column 5, line 5, before "wall" should be inserted --first--.
Column 5, line 35, "secnd" should read --second--.
Column 6, line 21, "portions" should read --portion--.

Signed and Sealed this

Eighth Day of November 1977

[SEAL]

Attest:

RUTH C. MASON
Attesting Officer

LUTRELLE F. PARKER
Acting Commissioner of Patents and Trademarks